(12) United States Patent
Tosatti

(10) Patent No.: US 10,656,701 B2
(45) Date of Patent: *May 19, 2020

(54) MANAGING PROCESSOR FREQUENCIES

(71) Applicant: Red Hat, Inc., Raleigh, NC (US)

(72) Inventor: Marcelo Wormsbecker Tosatti, Curitiba (BR)

(73) Assignee: Red Hat, Inc., Raleigh, NC (US)

( * ) Notice: Subject to any disclaimer, the term of this patent is extended or adjusted under 35 U.S.C. 154(b) by 89 days.

This patent is subject to a terminal disclaimer.

(21) Appl. No.: 15/860,291

(22) Filed: Jan. 2, 2018

(65) Prior Publication Data

US 2018/0173289 A1 Jun. 21, 2018

Related U.S. Application Data

(63) Continuation-in-part of application No. 15/381,348, filed on Dec. 16, 2016, now Pat. No. 9,876,602.

(51) Int. Cl.
*G06F 1/32* (2019.01)
*G06F 1/324* (2019.01)
*H04L 12/875* (2013.01)
*G06F 1/28* (2006.01)
*G06F 1/3206* (2019.01)
(Continued)

(52) U.S. Cl.
CPC ............... *G06F 1/324* (2013.01); *G06F 1/28* (2013.01); *G06F 1/3206* (2013.01); *H04L 47/56* (2013.01); *H04L 47/62* (2013.01); *H04L 49/40* (2013.01); *Y02D 50/10* (2018.01)

(58) Field of Classification Search
CPC .......... G06F 1/32; G06F 1/3206; G06F 1/324
See application file for complete search history.

(56) References Cited

U.S. PATENT DOCUMENTS 7,272,730 B1 9/2007 Acquaviva et al.
7,334,145 B2 2/2008 Grobman
(Continued)

OTHER PUBLICATIONS

Kotla, R., et al., "Scheduling Processor Voltage and Frequency in Server and Cluster Systems," University of Texas at Austin; IBM Austin Research Laboratory, 2005, http://citeseerx.ist.psu.edu/viewdoc/download?doi-10.1.1.424.5272&rep=rep1&type=pdf.
(Continued)

*Primary Examiner* — Scott M Sciacca
(74) *Attorney, Agent, or Firm* — Kilpatrick Townsend & Stockton LLP

(57) ABSTRACT

Processor frequencies can be managed. For example, a computing device can determine (i) a first estimate of an operating characteristic of a processor in using a first pair of frequencies to perform a task, and (ii) a second estimate of the operating characteristic of the processor in using a second pair of frequencies to perform the task. The computing device can select the first pair of frequencies based on determining that the first estimate is closer to a target operating-characteristic of the processor while performing the task than the second estimate. Based on selecting the first pair of frequencies, the computing device can set a clock rate of the processor to a lower frequency in the first pair of frequencies while performing the task. The computing device can also set the clock rate of the processor to a higher frequency in the first pair of frequencies while performing the task.

20 Claims, 6 Drawing Sheets

(51) Int. Cl.
   *H04L 12/863* (2013.01)
   *H04L 12/931* (2013.01)

(56) References Cited

U.S. PATENT DOCUMENTS

| | | |
|---|---|---|
| 7,716,506 B1 | 5/2010 | Surgutchik et al. |
| 7,826,460 B2 | 11/2010 | Lee |
| 7,913,071 B2 | 3/2011 | Mallik et al. |
| 9,195,296 B2 | 11/2015 | Shahidi et al. |
| 2005/0190714 A1 | 9/2005 | Gorbatov et al. |
| 2005/0232218 A1 | 10/2005 | Edwards et al. |
| 2011/0072295 A1 | 3/2011 | Shahidi et al. |
| 2014/0040647 A1* | 2/2014 | Bridges ............... G06F 1/324 713/322 |
| 2017/0060222 A1* | 3/2017 | Lee .................. G06F 1/3206 |
| 2018/0032418 A1* | 2/2018 | Wang ................ G06F 1/3206 |
| 2018/0157527 A1* | 6/2018 | Tung ................ G06F 9/4881 |
| 2018/0167878 A1* | 6/2018 | Lee .................. H04W 52/029 |

OTHER PUBLICATIONS

Tianzhou, C., et al., "A Practical Dynamic Frequency Scaling Scheduling Algorithm for General Purpose Embedded Operating System," International Journal of u- and e-Service, Science and Technology, 2009, 2(1):53-60 http://www.sersc.org/journals/IJUNESST/vol2_no1/7.pdf.

Rizvandi, N.B., et al., "Some Observations on Optimal Frequency Selection in DVFS-Based Energy Consumption Minimization," Centre for Distributed and High Performance Computing School of Information Technologies, University of Sydney; National ICT Australia (NICTA), 2006 https://arxiv.org/pdf/1201.1695.pdf.

\* cited by examiner

MANAGING PROCESSOR FREQUENCIES

REFERENCE TO RELATED APPLICATION

This is a continuation-in-part of co-pending U.S. patent application Ser. No. 15/381,348, titled "Managing Processor Frequencies" and filed on Dec. 16, 2016, the entirety of which is hereby incorporated by reference herein.

TECHNICAL FIELD

The present disclosure relates generally to power conservation. More specifically, but not by way of limitation, this disclosure relates to conserving power by managing processor frequencies.

BACKGROUND

Computing devices can transmit data packets through a network to communicate with one another. A network-hardware component (e.g., router, hub, switch, etc.) that forms at least a portion of the physical infrastructure behind the network can process the data packets and route the data packets to their destinations. Typically, the network-hardware component will receive the data packets and add the data packets to a queue, such as a data buffer. A processor of the network-hardware component will then analyze the data packets in the queue before routing the data packets to their destinations. The amount of time it takes the processor to analyze the data packets in the queue can depend on a clock rate of the processor. For example, if the clock rate of the processor is higher, such as 2.6 Gigahertz (GHz), the processor can typically process data packets in the queue faster than if the clock rate is lower, such as 1.8 GHz.

The amount of time the processor takes to process the data packets in the queue can affect the latency of the network. For example, if the processor takes longer to process the data packets in the queue, the latency of the network generally increases. Conversely, if the processor takes less time to process the data packets in the queue, the latency of the network generally decreases. Thus, to reduce the latency of the network, the clock rate of the processor often is maintained at a higher frequency so that the processor can process the data packets more quickly.

DETAILED DESCRIPTION

Figure 1:
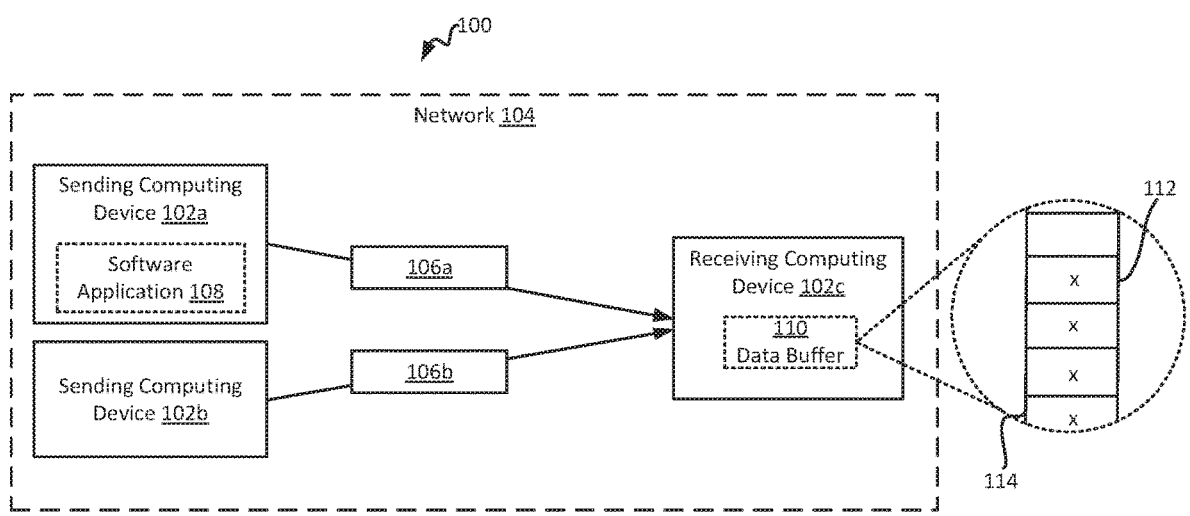
FIG. 1 is a block diagram of an example of a system for managing processor frequencies according to some aspects.

There can be disadvantages to maintaining the clock rate of a processor at a higher frequency when attempting to reduce network latency. For example, the processor may consume significantly more power (e.g., 50% more power) when operating at a higher frequency than when operating at a lower frequency. As a particular example, the processor may consume 235 watts (W) of power when operating at 2.5 GHz, whereas the processor may only consume 160 W of power when operating at 1.8 GHz.

Some examples of the present disclosure overcome one or more of the abovementioned issues by repeatedly switching the clock rate of the processor between different frequencies, rather than maintaining the clock rate of the processor a single, high frequency. The frequencies can be selected, and the timing for switching between the frequencies can be determined, so as to respect network latency requirements and reduce the amount of power consumed by the processor. This may result in data packets being communicated through the network within an acceptable latency period and in a more power-efficient manner.

In one particular example, multiple computing devices can transmit data packets through a network to a network-hardware component, such as a router. The network-hardware component can store the data packets in a queue and monitor the number of data packets in the queue. If the number of data packets in the queue is less than a threshold, the processor can operate at a lower frequency (e.g., 1.2 GHz), in which data packets are processed at a slower rate than they are received. This may cause the queue to fill with data packets. If the number of data packets in the queue meets or exceeds the threshold, the processor can switch to operating a higher frequency (e.g., 2.6 GHz), in which data packets are processed at a faster speed than they are received. This may drain the data packets from the queue. The processor can operate at the higher frequency until the queue is empty (or until the number of data packets in the queue falls below another threshold). Based on the queue being empty (or reaching the other threshold), the processor can then switch back to operating at the lower frequency, thereby allowing the queue to fill again and reducing power consumption. The processor can continue to repeat this process, switching between the lower frequency and the higher frequency.

The lower frequency and the higher frequency can be selected from among multiple clock rates at which the processor can operate. For example, the processor may be able to operate at the following clock rates: 1.2 GHz, 1.4 GHz, 1.6 GHz, 1.8 GHz, 2.0 GHZ, 2.2 GHz, 2.4 GHz, and 2.6 GHz. The processor can form multiple pairs of frequencies from these clock rates. For example, the processor can form a first pair of frequencies that includes the frequencies 1.2 GHz and 2.6 GHz. The processor can form a second pair of frequencies that includes the frequencies 1.4 GHz and 2.4 GHz. The processor can then determine the amount of power that the processor would consume using each pair of frequencies, as discussed in greater detail below. The processor can select the pair of frequencies associated with the lowest amount of power consumption for use as the lower frequency and the higher frequency. This process may enable the processor to select the optimal pair of frequencies that results in the lowest amount of power consumption from among all of the pairs of frequencies.

In some examples, the processor can determine the threshold number of data packets for the data buffer based on a latency requirement, thereby helping to ensure that the latency requirement is met. The latency requirement can be, for example, a maximum amount of latency that the network, a computing device, an application, or any combination of these can tolerate. For example, the processor can receive user input indicating that the maximum latency that the network can tolerate is 20,000 nanoseconds (ns). The processor can also receive user input indicating that the amount of time it takes the processor to analyze a single data packet when operating at the higher frequency is 111.688 ns. The processor can divide the maximum latency (20,000 ns) by the amount of time it takes the processor to analyze a single data packet (111.688 ns) to determine that the threshold is to be 179 data packets.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for managing processor frequencies according to some aspects. The system 100 includes a network 104 in which sending computing devices 102a-b are transmitting data packets 106a-b to a receiving computing device 102c. The receiving computing device 102c can receive the data packets 106a-b and add the data packets 106a-b to a data buffer 110 (e.g., a queue). In this example, the receiving computing device 102c is a network-hardware component (e.g., a router) that receives the data packets 106a-b from the sending computing devices 102a-b, processes the data packets 106a-b, and transmits the data packets 106a-b to a further computing device via another network connection.

The receiving computing device 102c includes a processor that can operate at two or more frequencies. For example, the processor can operate a lower frequency to process at least some of the data packets in the data buffer 110 and a higher frequency to process at least some of the data packets in the data buffer 110. In some examples, the processor can operate at the lower frequency until a number of data packets in the data buffer 110 meets or exceeds a threshold 112, at which point the processor can switch to operating at the higher frequency. The processor can operate at the higher frequency to drain the data packets from the data buffer. In some examples, the processor can continue to operate at the higher frequency until the number of data packets in the data buffer 110 falls below another threshold 114 or the data buffer 110 becomes completely empty, at which point the processor can switch back to operating at the lower frequency.

In some examples, the system 100, or a portion of the system 100, can have a latency requirement. For example, the network 104, a sending computing device 102a, the receiving computing device 102c, a software application 108 (e.g., a game, a utility application, a back-up application for backing up user data, an operating system, etc.), or any combination of these may only be able to tolerate up to a certain amount of latency. As discussed in greater detail below, the receiving computing device 102c can determine the low frequency, the high frequency, the threshold 112, the other threshold 114, or any combination of these based on the latency requirement.

In some examples, the receiving computing device 102c may be operating under a particular condition, such as a heavy data-packet load in which the receiving computing device 102c is receiving a high volume of data packets 106a-b, a light data-packet load in which the receiving computing device 102c is receiving a low volume of data packets 106a-b, a heavy processing load in which the receiving computing device 102c is processing a high volume of information, a light processing load in which the receiving computing device 102c is processing a low volume of information, etc. Additionally or alternatively, the receiving computing device 102c may be in a particular state, such as a standby mode, a network-security mode, a high-data transfer mode, a shutdown mode, a boot-up mode, etc. The receiving computing device 102c can determine the low frequency, the high frequency, the threshold 112, the other threshold 114, or any combination of these based on the condition and/or state associated with the computing device 102. For example, the receiving computing device 102c can determine one pair of frequencies to use when the receiving computing device 102c has a heavier processing load, and another pair of frequencies to use when the receiving computing device 102c has a lighter processing load.

The network 104 can include any number and combination of sub-networks. The network 104 can be wired, wireless networks, or any combination of these. Examples of the network 104 can include a local area network (LAN), a wide area network (WAN), the Internet, a cloud-computing environment, a cloud federation, a telecommunication network, a cellular network, or any combination of these.

The network 104 can also include any number and combination of computing devices 102a-c. Examples of the computing devices 102a-c can be desktop computers, laptop computers, servers, network-hardware components, mobile phones, or any combination of these. For example, the sending computing devices 102a-b can both be servers. The receiving computing device 102c can be a router for receiving the data packets 106a-b from the servers, processing the data packets 106a-b using at least two different clock frequencies, and transmitting the processed data packets to a destination.

Figure 2:
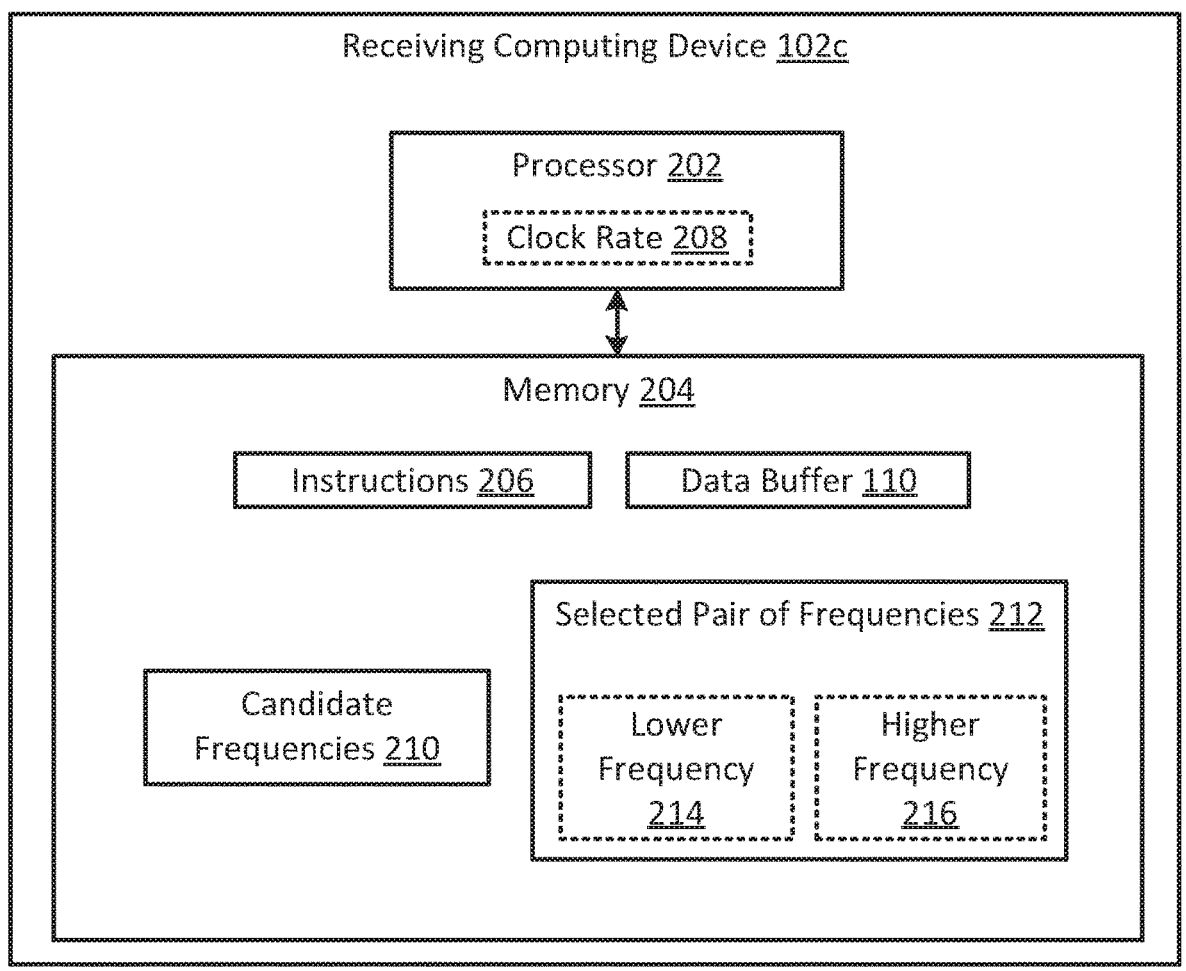
FIG. 2 is a block diagram of an example of a receiving computing device for managing processor frequencies according to some aspects.

One example of a block diagram of the receiving computing device 102c is shown in FIG. 2. As shown in FIG. 2, the receiving computing device 102c can include a processor 202 and a memory 204. In some examples, the processor 202 and memory 204 can be integrated into a single computing device. In other examples, the processor 202 and memory 204 can be distributed among two or more computing devices.

The processor 202 can execute one or more operations for managing processor frequencies. The processor 202 can execute instructions 206 stored in the memory 204 to perform the operations. The processor 202 can include one processor or multiple processors. Non-limiting examples of the processor 202 include a Field-Programmable Gate Array (FPGA), an application-specific integrated circuit (ASIC), a microprocessor, etc. In one example, the processor 202 is an Intel® Xeon® processor.

The processor 202 can be communicatively coupled to the memory 204 via a bus. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. In some examples, at least some of the memory 204 can include a medium from which the processor 202 can read the instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read instructions. The instructions 206 can include processor-specific instructions generated by a compiler or an interpreter from code written in any suitable computer-programming language, such as C, C++, C#, etc.

The memory 204 can store two or more candidate frequencies 210 at which the processor 202 can operate. For example, the memory 204 can store a first frequency, which may be 1.2 GHz; a second frequency, which may be 2.2 GHz; and a third frequency, which may be 1.8 GHz. In some examples, a user may have determined the candidate frequencies 210 from the processor's manual and preprogrammed the computing device 102 with the candidate frequencies 210.

The processor 202 can select at least one pair of frequencies 212 from among the candidate frequencies 210 to use to process the data packets in the data buffer 110. For example, the processor 202 can select a pair of frequencies 212 to use when the processor 202 is operating in a first state and another pair of frequencies to use when the processor 202 is operating in a second state. When the processor 202 is operating in the first state, the processor 202 can switch a clock rate 208 of the processor 202 between a lower frequency 214 in the pair of frequencies 212 and a higher frequency 216 in the pair of frequencies 212 based on the amount of data packets in the data buffer 110. And, when the processor 202 is operating in the second state, the processor 202 can switch the clock rate 208 of the processor 202 between another lower frequency in the other pair of frequencies and another higher frequency in the other pair of frequencies based on the amount of data packets in the data buffer 110. This may reduce the amount of power consumed by the processor 202 to process the data packets in the data buffer 110.

Figure 3:
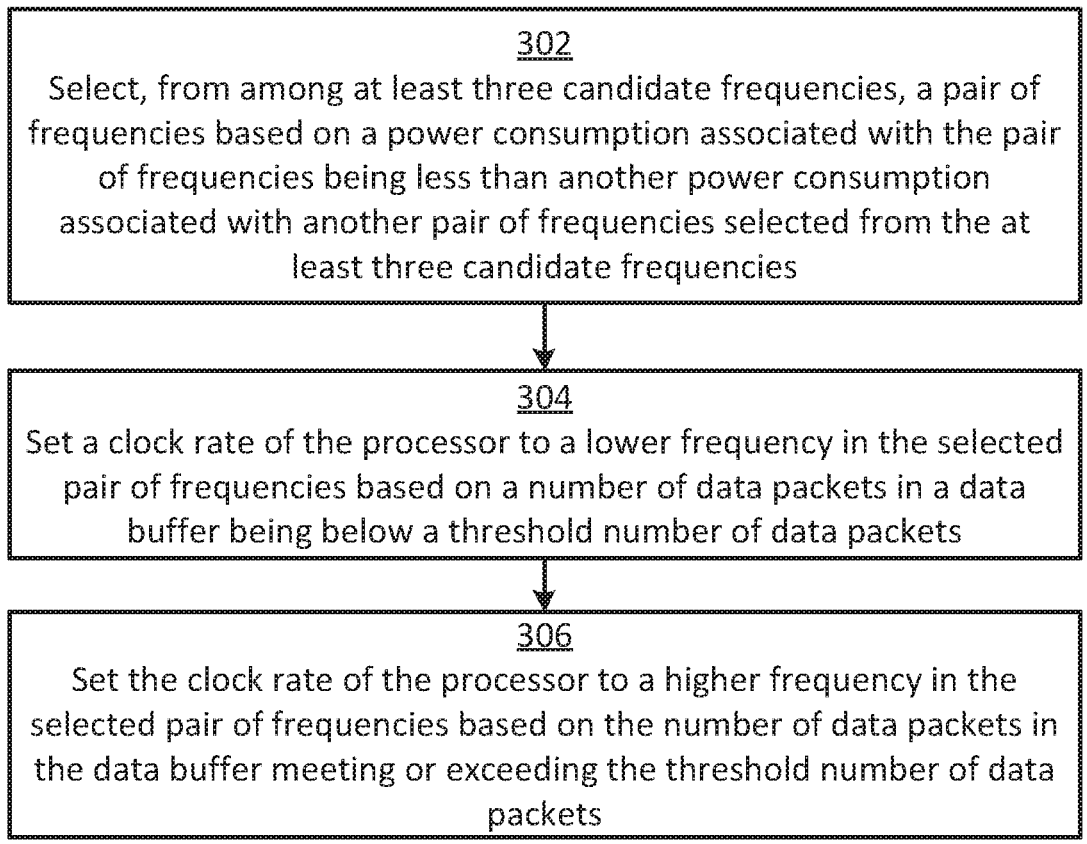
FIG. 3 is a flow chart showing an example of a process for managing processor frequencies according to some aspects.

In some examples, the processor 202 can implement one or more of the abovementioned features by performing some or all of the steps described below with respect to FIG. 3. Some examples can include more, fewer, or different steps than the steps depicted in FIG. 3. The steps of FIG. 3 are described with reference to components described above with regard to FIGS. 1-2.

In block 302, the processor 202 selects, from among at least three candidate frequencies 210, a pair of frequencies 212 based on a power consumption associated with the pair of frequencies 212 being less than another power consumption associated with another pair of frequencies selected from the at least three candidate frequencies 210.

In some examples, the processor 202 can select the pair of frequencies 212 at least in part by forming multiple pairs of frequencies from among the candidate frequencies 210. For example, the processor 202 can determine every possible pair of frequencies among the candidate frequencies 210. As another example, the processor 202 can determine several of the highest-frequency candidates and several of the lowest-frequency candidates and use these frequencies to form the multiple pairs of frequencies. As still another example, the processor 202 can select the highest-frequency candidate and multiple lower-frequency candidates. The processor 202 can then form multiple pairs of frequencies that all have the selected highest-frequency candidate and at least one of the lower-frequency candidates. As yet another example, the processor 202 can select the lowest-frequency candidate and multiple higher-frequency candidates. The processor 202 can then form multiple pairs of frequencies that all have the selected lowest-frequency candidate and at least one of the higher-frequency candidates. The processor 202 can use any number and combination of techniques to form multiple pairs of frequencies from among the candidate frequencies 210.

After forming the multiple pairs of frequencies, the processor 202 can determine how much power the processor 202 would consume using each pair of frequencies. For example, the processor 202 can determine how much power the processor 202 would consume using each pair of frequencies by performing some or all of the steps shown in FIGS. 4-5. The processor 202 can then determine which pair of frequencies is associated with the lowest amount of power consumption and select that pair of frequencies.

In block 304, the processor 202 sets a clock rate 208 of the processor 202 to a lower frequency 214 in the selected pair of frequencies 212 based on a number of data packets in a data buffer 110 being below a threshold 112. The threshold 112 can be predetermined using some or all of the steps shown in FIG. 4.

For example, the processor 202 can monitor the number of data packets in the data buffer 110 to determine if the number of data packets in the data buffer 110 is below the threshold 112. If so, the processor 202 can update a value for a memory location of a local memory (of the processor 202) to indicate that the clock rate 208 is to be the lower frequency 214. The processor 202 may access the memory location and operate at the lower frequency 214 indicated by the memory location.

In block 306, the processor 202 sets the clock rate 208 of the processor 202 to a higher frequency 216 in the selected pair of frequencies 212 based on a number of data packets in a data buffer 110 meeting or exceeding the threshold 112. For example, the processor 202 can monitor the number of data packets in the data buffer 110 to determine if the number of data packets in the data buffer 110 meets or exceeds the threshold 112. If so, the processor 202 can update the value for the memory location in the local memory to indicate that the clock rate 208 is to be the higher frequency 216. The processor 202 may access the memory location and operate at the higher frequency 216 indicated by the memory location.

In some examples, the processor 202 can operate at the higher frequency 216 until the data buffer 110 is empty (or until the number of data packets in the data buffer 110 falls below another threshold 114). Based on the data buffer 110 being empty (or reaching the other threshold 114), the processor 202 can then switch back to operating at the lower frequency 214, thereby allowing the data buffer 110 to fill again and reducing power consumption. The processor 202 can continue to repeat this process, switching between the lower frequency 214 and the higher frequency 216.

Figure 4:
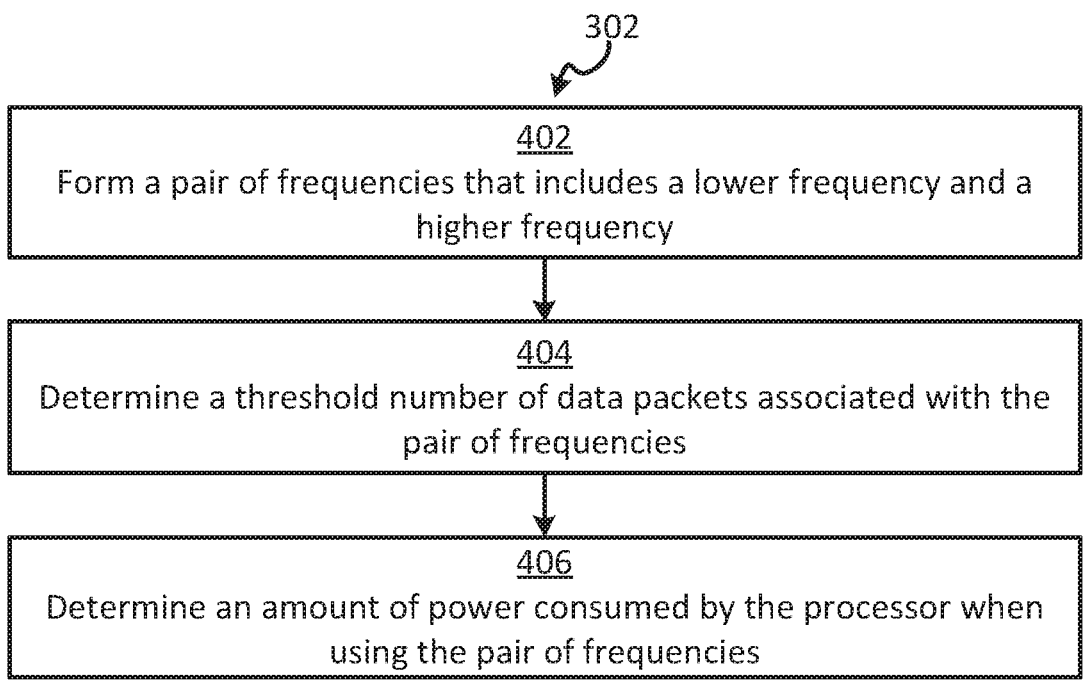
FIG. 4 is a flow chart showing an example of a process for determining information associated with a pair of frequencies according to some aspects.

FIG. 4 is a flow chart showing an example of a process for determining information associated with a pair of frequencies according to some aspects. Some examples can include more, fewer, or different steps than the steps depicted in FIG. 4. The steps of FIG. 4 are described with reference to components described above with regard to FIGS. 1-2.

In block 402, the processor 202 forms a pair of frequencies that includes a lower frequency 214 and a higher frequency 216. For example, the processor 202 can randomly select two different frequencies from among the candidate frequencies 210, and treat the two different frequencies as the pair of frequencies. And, inherently, one of the frequencies will be lower than the other. In other examples, the processor 202 can form the pair of frequencies using any of the methods discussed above with respect to block 302 of FIG. 3.

In block 404, the processor 202 determines a threshold number of data packets, such as threshold 112, associated with the pair of frequencies. The processor 202 can determine the threshold 112 based on a latency constraint and the higher frequency 216. For example, the processor 202 can receive, as user input, a latency constraint indicating that the maximum-latency period that a software application 108 can tolerate is 20,000 nanoseconds (ns). The user may be able to obtain this information based on a manual, readme file, or other data provided by a manufacturer of the software application 108. The processor 202 can also receive, as user input, the amount of time it takes the processor 202 to process a single data packet while operating at the higher frequency 216. For example, the processor 202 can receive user input indicating that the amount of time it takes the processor 202 to analyze a single data packet is 129.063 ns when the processor 202 is operating at 2.1 GHz. The user may be able to obtain this information from a manual for the processor 202. The processor 202 can then determine the amount of data packets the processor 202 can process while respecting the latency constraint. For example, the processor 202 can divide the maximum-latency period by the amount of time it takes the processor 202 to process the single data packet when the processor 202 is operating at the higher frequency 216. The result can indicate the amount of data packets the processor 202 can process within the maximum-latency period while operating at the higher frequency 216. The processor 202 can use this amount of data packets as the threshold 112.

In block 406, the processor 202 determines an amount of power consumed by the processor 202 when using the pair of frequencies. In some examples, the processor 202 can perform some or all of the steps shown in FIG. 5 to determine the power consumed by the processor 202 using the pair of frequencies. And some examples can perform more, fewer, or different steps than the steps depicted in FIG. 5.

Figure 5:
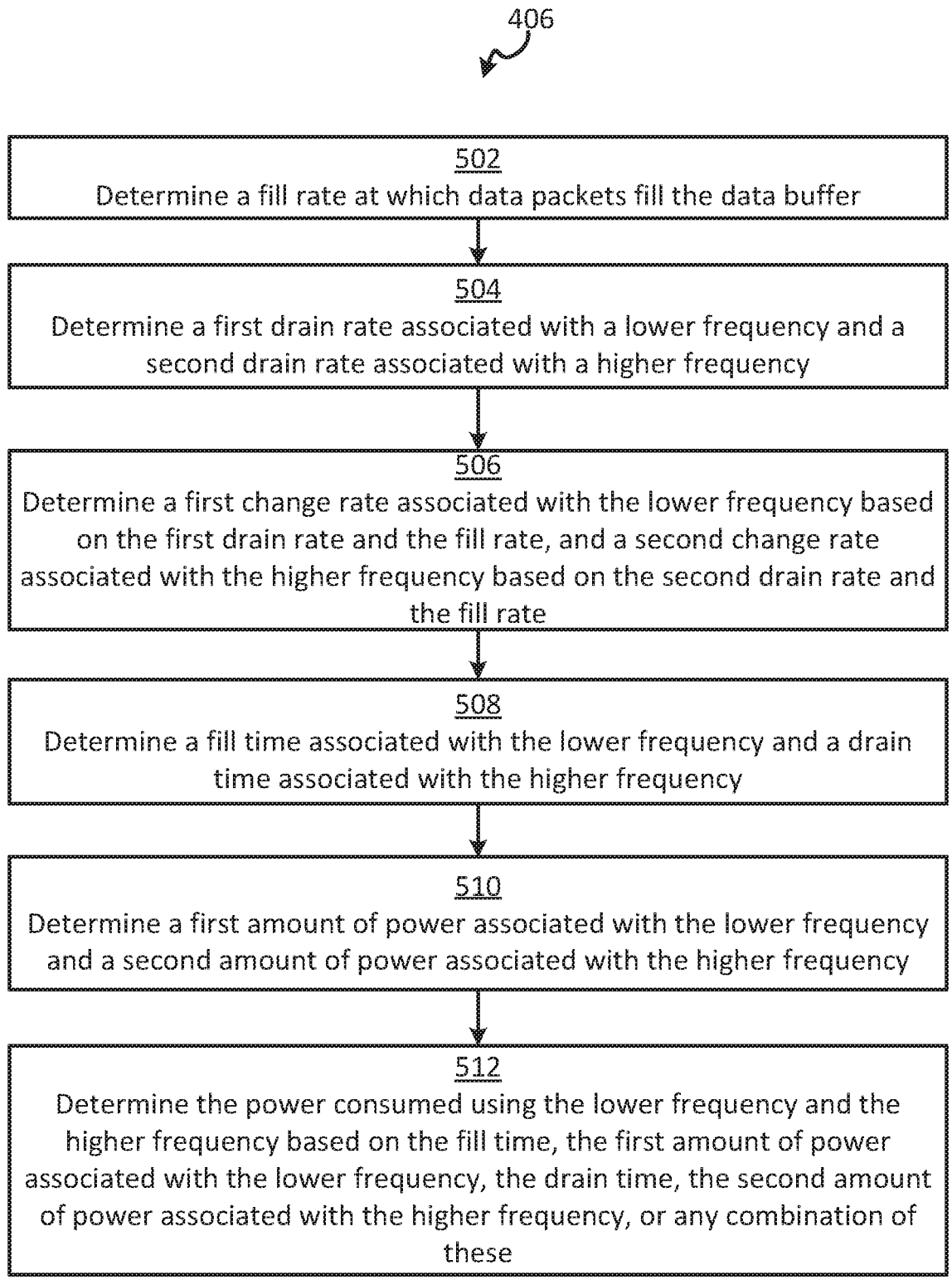
FIG. 5 is a flow chart showing an example of a process for determining an amount of power consumed by a pair of frequencies according to some aspects.

Turning now to FIG. 5, in block 502 the processor 202 determines a fill rate at which data packets fill the data buffer 110. For example, if the network 104 has a bandwidth of 10 gigabits per second (Gbit/s) and uses 64-byte data packets, the fill rate can be determined by dividing 10 Gbit/s by (64 bytes*8 bits/byte), which results in a theoretical maximum packet rate of 1,953,125 packets/s. As another example, if the network 104 has a bandwidth of 10 Gbit/s and uses 1500-byte data packets, the fill rate can be determined by dividing 10 Gbit/s by (1500 bytes*8 bits/byte), which results in a theoretical maximum packet rate of 83,333 packets/s. The processor 202 can perform these calculations to determine the fill rate, or can receive the fill rate as user input.

In block 504, the processor 202 determines a first drain rate associated with a lower frequency 214 and a second drain rate associated with a higher frequency 216. A drain rate can be determined via the following equation:

$$\text{Drain rate} = \frac{1}{ProcessingTimePerPacket}$$

where ProcessingTimePerPacket is the amount of time it takes the processor 202 to process a single data packet when operating at a particular frequency. For example, the processor 202 can determine that the rate at which the processor 202 can process a single data packet when operating at the lower frequency 214 is 146.813 ns/packet. For instance, a user can provide this information as user input. The processor 202 can then determine that the first drain rate is $6.811*10^8$ packets/s by calculating the inverse of 146.813 ns/packet. The processor 202 can also determine that the rate at which the processor 202 can process a single data packet when operating at the higher frequency 216 is 111.688 ns/packet. For instance, the user can also provide this information as user input. The processor 202 can then determine that the second drain rate is $8.95*10^6$ packets/s by calculating the inverse of 111.688 ns/packet.

In block 506, the processor 202 determines a first change rate associated with the lower frequency 214 based on the first drain rate and the fill rate, and a second change rate associated with the higher frequency 216 based on the second drain rate and the fill rate. A change rate can be a rate at which the data buffer 110 grows or shrinks when the processor 202 is operating at a particular frequency. The processor 202 can determine a change rate associated with a particular frequency by subtracting the drain rate associated with the particular frequency from the fill rate. For example, the processor 202 can determine that the first change rate associated with the lower frequency 214 is $1.001*10^6$ packets/s by subtracting the first drain rate from the fill rate. The processor 202 can determine that the second change rate associated with the higher frequency 216 is $1.140*10^6$ packets/s by subtracting the second drain rate from the fill rate.

In block 508, the processor 202 determines a fill time associated with the lower frequency 214 and a drain time associate with the higher frequency 216. The fill time can be the amount of time it takes the data buffer 110 to meet or exceed the threshold 112 when the processor 202 is operating at the lower frequency 214. The drain time can be the amount of time it takes the data buffer 110 to drain to below the other threshold 114 when the processor 202 is operating at the higher frequency 216. In some examples, the processor 202 can determine the fill time by dividing the threshold 112 by the first change rate associated with the lower frequency 214. For example, if the threshold 112 is 179 data packets, the processor 202 can determine that the fill time is 0.0017882 seconds by dividing 179 packets by $1.001*10^6$ packets/s. The processor 202 can determine the drain time by dividing the threshold 112 by the second change rate associated with the higher frequency 216. For example, if the threshold 112 is 179 data packets, the processor 202 can determine that the drain time is 0.0001570 seconds by dividing 179 packets by $1.140*10^6$ packets/s.

In block 510, the processor 202 determines a first amount of power associated with the lower frequency 214 and a second amount of power associated with the higher frequency 216. The first amount of power can be an amount of power consumed by the processor 202 when operating at the lower frequency 214, and the second amount of power can be an amount of power consumed by the processor 202 when operating at the higher frequency 216. An example of the first amount of power can be 160 W and an example of the second amount of power can be 235 W.

In some examples, the processor 202 can receive the first amount of power, the second amount of power, or both as user input. For example, a user can determine the first amount of power and the second amount of power using a manual provided by a manufacturer of the processor 202. As another example, the user can determine the first amount of power and the second amount of power by testing the power consumption of the processor 202 using one or more meters (e.g., a voltmeter, an ammeter, a power meter, or any combination of these). In either example, the user can then provide the first amount of power and the second amount of power as input to the processor 202.

In block 512, the processor 202 determines the power consumed using the lower frequency and the higher frequency based on the fill time, the first amount of power associated with the lower frequency 214, the drain time, the second amount of power associated with the higher frequency 216, or any combination of these. In some examples, the processor 202 can use the following equation to determine the power consumed using the lower frequency 214 and the higher frequency 216 during one cycle of processing (e.g., filling the data buffer 110 to the threshold 112 using the lower frequency 214 and then draining the data buffer 110 to below the other threshold 114 using the higher frequency 216):

$$\text{Total power consumed} = \text{fillTime} * \text{powerLower} + \text{drainTime} * \text{powerHigher}$$

where fillTime is the fill time determined in block 508, powerLower is the first amount of power determined in block 510, drainTime is the drain time determined in block 508, and powerHigher is the second amount of power determined in block 510. In one particular example, the fillTime is 0.00178876 seconds, the powerLower is 160 W, the drainTime is 0.00015693 seconds, and the powerHigher is 235 W. In such an example, the Total power consumed by the processor 202 during a single cycle of processing is 0.3231 W.

In some examples, the processor 202 can repeat some or all of the steps of FIGS. 4-5 to determine a respective threshold number of data packets associated with each pair of frequencies, a respective amount of power consumed using each pair of frequencies, or both of these. The processor 202 may then form a database that includes some or all of this information. In some examples, the processor 202 can use the database to compare the respective amounts of power consumed using each pair of frequencies to determine which pair of frequencies results in the least amount of power consumption. The processor 202 can then select that pair of frequencies (and the associated threshold 112) for use in the process of FIG. 3.

Although the examples described herein include the processor 202 switching between two frequencies (a lower frequency 214 and a higher frequency 216), in other examples, the processor 202 can switch between three or more frequencies. For example, the processor 202 can begin at a first frequency, switch to a second frequency based on the number of data packets in the data buffer 110 meeting or exceeding a first threshold, and switch to a third frequency based on the number of data packets in the data buffer 110 meeting or exceeding a second threshold. The processor 202 can switch between any number and combination of frequencies based on any number and combination of thresholds. This may further reduce the total power consumed by the processor 202 to process the data packets in the data buffer 110.

Figure 6:
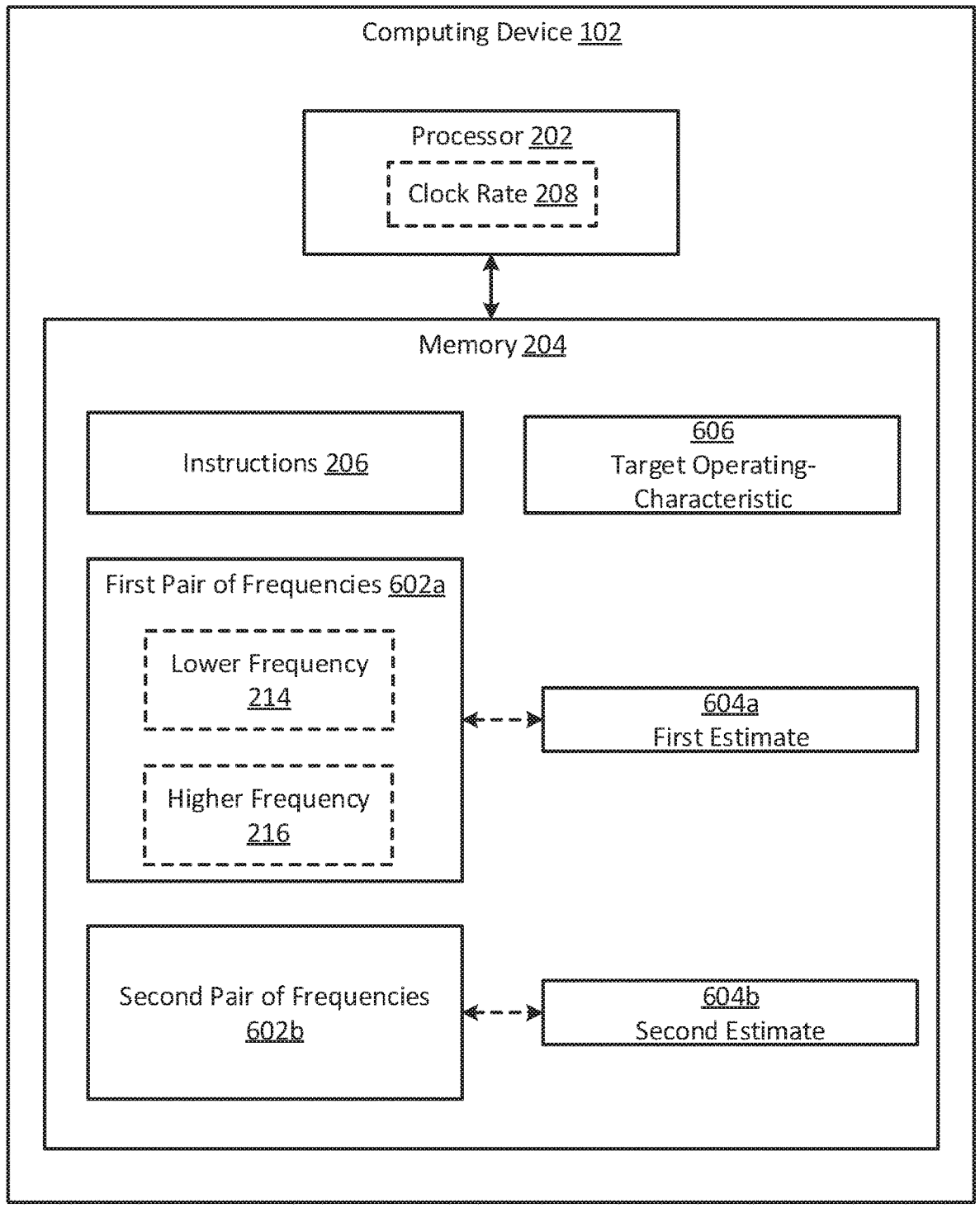
FIG. 6 is a block diagram of an example of a computing device for managing processor frequencies according to some aspects.

FIG. 6 is a block diagram of an example of a computing device 102 for managing processor frequencies according to some aspects. In some examples, the computing device 102 can be similar to the sending computing devices 102*a*-*b* or the receiving computing device 102*c* of FIG. 1.

The computing device 102 can receive an input indicating a target operating-characteristic for the processor 202 while the processor 202 is performing a task (e.g., a computing task, such as a data analysis task). Examples of the target-operating characteristic can include (i) a target amount of power that the processor 202 is to consume while performing the task, (ii) a maximum amount of power that the processor 202 is to consume while performing the task, (iii) a minimum amount of power that the processor 202 is to consume while performing the task, (iv) a target speed at which the processor 202 is to perform the task, (v) a maximum speed at which the processor 202 is to perform the task, (vi) a minimum speed at which the processor 202 is to perform the task, or (vii) any combination of these. The computing device 102 may receive the input as user input via a user input device, an electronic communication from another computing device, an output from a software application, or any combination of these.

Based on the user input, the computing device 102 can determine which pair of frequencies among a set of candidate frequencies (e.g., candidate frequencies 210) will cause the processor 202 to operate in a particular manner in relation to the target operating-characteristic 606 while performing the task. For example, the computing device 102 can generate multiple (e.g., dozens or hundreds of) pairs of frequencies from among the candidate frequencies. For each pair of frequencies, the computing device 102 can estimate an operating characteristic of the processor 202 when using the pair of frequencies to perform the task. For example, the computing device 102 can estimate the amount of power consumed by the processor 202 when using a particular pair of frequencies to perform the task, a speed at which the processor 202 can perform the task when using the particular pair of frequencies, or both. In one such example, the computing device 102 can estimate that the processor 202 is capable of performing the task at a particular speed and with a particular amount of power consumption when using a particular pair of frequencies. The processor 202 can then select whichever pair of frequencies has a corresponding estimate that meets one or more predefined criteria.

For example, the processor 202 can select the pair of frequencies that is closest to the target operating-characteristic 606, exceeds the target operating-characteristic 606 (e.g., if the target operating characteristic is a lower threshold), is below the target operating-characteristic 606 (e.g., if the target operating characteristic is an upper threshold), or any combination of these. For example, if the target operating-characteristic 606 of the processor 202 includes a maximum power-consumption threshold and a minimum-speed threshold, the processor 202 can select the pair of frequencies configured to cause the processor 202 to perform the task at a speed that is above the minimum-speed threshold and with a power consumption that is below the maximum power-consumption threshold.

In some examples, the processor 202 can select the pair of frequencies that is less than, and closest to, the target operating-characteristic 606. For example, the target operating-characteristic 606 may be a maximum power-consumption threshold. And it may be desirable (e.g., for speed or latency reasons) to get as close to the maximum power-consumption threshold, without exceeding it. So, the computing device 102 may do an initial filtering among the pairs of frequencies identify which pairs of frequencies are less than or equal to the maximum power-consumption threshold. The computing device 102 may then compare each estimate corresponding to an identified pair of frequencies the maximum power-consumption threshold to determine a difference between the estimate and the maximum power-consumption threshold. The computing device 102 can use the differences between the estimates and the target operating-characteristic 606 to determine which pair of frequencies has an estimate that is closest to the maximum power-consumption threshold.

In the specific example shown in FIG. 6, the computing device 102 can determine the first pair of frequencies 602a and the second pair of frequencies 602b from among the candidate frequencies. The computing device 102 can then determine a first estimate 604a of an operating characteristic of the processor 202 corresponding to the first pair of frequencies 602a. This may be, for example, a first estimate of the amount of power consumed by the processor 202 in using the first pair of frequencies 602a to perform a task, a first speed at which the processor 202 can perform the task when using the first pair of frequencies 602a, or both. The computing device 102 can also determine a second estimate 604b of an operating characteristic of the processor 202 corresponding to the second pair of frequencies 602b. This may be a second estimate of the amount of power consumed by the processor 202 in using the second pair of frequencies 602a to perform the task, a second speed at which the processor 202 can perform the task when using the second pair of frequencies 602b, or both. The processor 202 may then determine that the first estimate 604a is (i) less than the second estimate 604b, (ii) greater than the second estimate 604b, (iii) closer to the target operating-characteristic 606 of the processor 202 than the second estimate 604b, (iv) less than or equal to the target operating-characteristic 606, (v) greater than or equal to the target operating-characteristic 606, or (vi) any combination of these. Based on this determination, the computing device 102 can select the first pair of frequencies 602a for use in performing the task.

After selecting the first pair of frequencies 602a, the computing device 102 may then perform the task. The computing device 102 can perform the task at least partially by using a lower frequency 214 in the first pair of frequencies 602a. This may involve setting the clock rate 208 of the processor 202 to the lower frequency 214 for a first time period while performing the task. In some examples, the computing device 102 can determine the first time period based on a first amount of power consumed by the processor 202 at the lower frequency 214. The computing device 102 can also perform the task at least partially by using a higher frequency 216 in the first pair of frequencies 602a. This may involve setting the clock rate 208 to the higher frequency 216 for a second time period while performing the task, respectively. In some examples, the computing device 102 can determine the second time period based on a second amount of power consumed by the processor 202 at the higher frequency 216. In one such example, the target operating-characteristic 606 of the processor 202 can be a maximum amount of power to be consumed by the processor 202 to perform the task. The computing device 102 can use the second amount of power to determine the maximum length of time at which the processor 202 can run at the higher frequency 216 (which can consume more power) before having to switch to the lower frequency 214 (which can consume less power) to keep the total power-consumption of the processor 202 to less than or equal to the target-operating characteristic.

Figure 7:
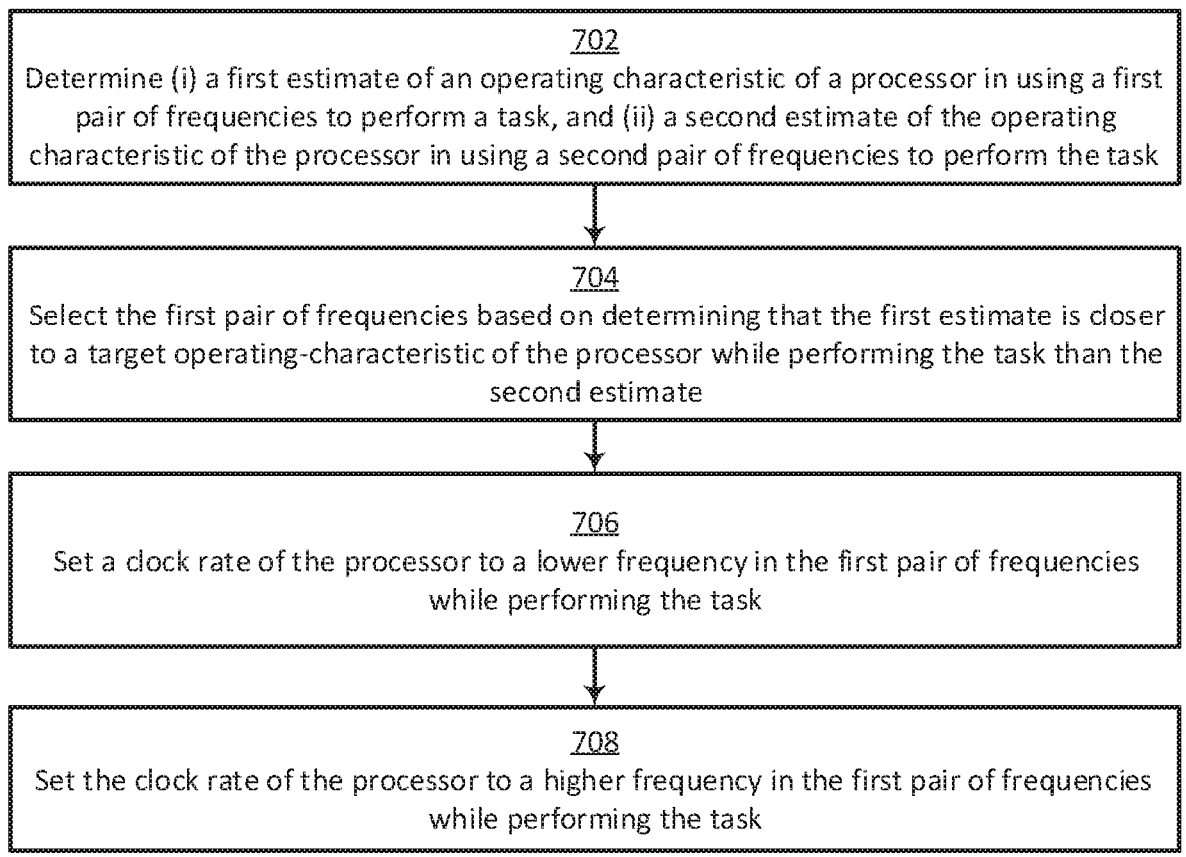
FIG. 7 is a flow chart of an example of a process for managing processor frequencies according to some aspects.

FIG. 7 is a flow chart showing an example of a process for managing processor frequencies according to some aspects. Some examples can include more, fewer, or different steps than the steps depicted in FIG. 7. The steps of FIG. 7 are described with reference to components described above with regard to FIG. 6.

In block 702, the processor 202 determines a first estimate 604a of an operating characteristic of a processor 202 in using a first pair of frequencies 602a to perform a task. The processor 202 also determines a second estimate 604b of an operating characteristic of a processor 202 in using a second pair of frequencies 602b to perform a task. In some examples, the processor 202 can determine the first estimate 604a, the second estimate 604b, or both using a database (e.g., lookup table). The database can includes a relationship between processor frequencies and power consumption. For example, the database can include various frequencies at which the processor 202 can operate mapped to corresponding amounts of power consumed at each of those frequencies. The processor 202 can use the database to determine how much power would be consumed in using the first pair of frequencies 602a to perform the task.

In block 704, the processor 202 selects the first pair of frequencies 602a based on determining that the first estimate 604a is closer to a target operating-characteristic 606 of the processor 202 while performing the task than the second estimate 604b. The target operating-characteristic 606 can be provided as user input. In some examples, the processor 202 can compare the first estimate 604a to the target operating-characteristic 606 to determine a difference between the two. The processor 202 can also compare the second estimate 604b to the target operating-characteristic 606 to determine a difference between the two. Based on these differences, the processor 202 can determine that the first estimate 604a is closer to a target operating-characteristic 606 of the processor 202 than the second estimate 604b.

In block 706, the processor 202 sets a clock rate 208 of the processor 202 to a lower frequency 214 in the first pair of frequencies 602a. For example, the processor 202 can update the value for the memory location in the local memory to indicate that the clock rate 208 is to be the lower frequency 214. The processor 202 may access the memory location and operate at the lower frequency 214 indicated by the memory location.

In block 708, the processor 202 sets a clock rate 208 of the processor 202 to a higher frequency 216 in the first pair of frequencies 602a. For example, the processor 202 can update the value for the memory location in the local memory to indicate that the clock rate 208 is to be the higher frequency 2146 The processor 202 may access the memory location and operate at the higher frequency 216 indicated by the memory location.

In some examples, sets 706-708 can iterate such that the processor 202 repeatedly switches between the lower frequency 214 and the higher frequency 216 multiple time to achieve the target operating-characteristic.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A method comprising:
   determining, by a processor, (i) a first estimate of an operating characteristic of the processor in using a first pair of frequencies to perform a task, and (ii) a second estimate of the operating characteristic of the processor in using a second pair of frequencies to perform the task;
   selecting, by the processor, the first pair of frequencies based on determining that the first estimate is closer to a target operating-characteristic of the processor while performing the task than the second estimate; and
   based on selecting the first pair of frequencies:

setting, by the processor, a clock rate of the processor to a first frequency in the first pair of frequencies while performing the task; and changing, by the processor, the clock rate of the processor from the first frequency to a second frequency in the first pair of frequencies while performing the task.

2. The method of claim 1, wherein the target operating-characteristic is received as user input and comprises a target amount of power consumption by the processor while performing the task, and wherein determining the first estimate and the second estimate comprises:

determining a first estimate of an amount of power consumed by the processor in using the first pair of frequencies to perform the task; and determining a second estimate of the amount of power consumed by the processor in using the second pair of frequencies to perform the task.

3. The method of claim 2, wherein determining the first estimate of the amount of power consumed by the processor comprises:

determining the amount of power consumed by the processor at the first frequency;

determining that the processor is to use the first frequency for a first time period while performing the task based on the amount of power consumed by the processor at the first frequency;

determining the amount of power consumed by the processor at the second frequency; and determining that the processor is to use the second frequency for a second time period while performing the task based on the amount of power consumed by the processor at the second frequency.

4. The method of claim 2, wherein the target operating-characteristic is a maximum amount of power consumption, and determining that the first estimate is closer to the target operating-characteristic than the second estimate comprises:

determining that the first estimate is less than or equal to the maximum amount of power consumption;

determining that the second estimate is less than or equal to the maximum amount of power consumption; and determining that the first estimate is closer to the maximum amount of power consumption than the second estimate by comparing (i) a first difference between the first estimate and the maximum amount of power consumption to (ii) a second difference between the second estimate and the maximum amount of power consumption.

5. The method of claim 2, wherein:

the target operating-characteristic comprises both (i) a target speed at which the processor is to perform the task and (ii) the target amount of power consumption by the processor while performing the task;

the first estimate indicates that the processor is capable of performing the task at a first speed and with a first amount of power consumption by using the first pair of frequencies; and the second estimate indicates that the processor is capable of performing the task at a second speed and with a second amount of power consumption by using the second pair of frequencies.

6. The method of claim 5, further comprising selecting the first pair of frequencies by determining that at least one of (i) the first speed is closer to the target speed than the second speed, or (ii) the first amount of power consumption is closer to the target amount of power consumption than the second amount of power consumption.

7. The method of claim 6, wherein selecting the first pair of frequencies comprises determining that the first speed is closer to the target speed than the second speed, and the first amount of power consumption is closer to the target amount of power consumption than the second amount of power consumption.

8. The method of claim 6, wherein the target speed is a minimum speed at which the processor is to perform the task, and wherein selecting the first pair of frequencies comprises determining that (i) the first speed is greater than or equal to the minimum speed at which the processor is to perform the task, and (ii) the first amount of power consumption is closer to the target amount of power consumption than the second amount of power consumption.

9. A system comprising:

a processor; and a memory on which instructions that are executable by the processor are stored for causing the processor to:

determine (i) first estimate of an operating characteristic of the processor in using a first pair of frequencies to perform a task, and (ii) a second estimate of the operating characteristic of the processor in using a second pair of frequencies to perform the task;

select the first pair of frequencies based on determining that the first estimate is closer to a target operating-characteristic of the processor while performing the task than the second estimate; and based on selecting the first pair of frequencies:

set clock rate of the processor to a first frequency in the first pair of frequencies while performing the task; and change the clock rate of the processor from the first frequency to a second frequency in the first pair of frequencies while performing the task.

10. The system of claim 9, wherein the target operating-characteristic is received as user input and comprises a target amount of power consumption by the processor while performing the task, and wherein the memory further comprises instructions that are executable by the processor for causing the processor to determine the first estimate and the second estimate by:

determining a first estimate of an amount of power consumed by the processor in using the first pair of frequencies to perform the task; and determining a second estimate of the amount of power consumed by the processor in using the second pair of frequencies to perform the task.

11. The system of claim 10, wherein the memory further comprises instructions that are executable by the processor for causing the processor to determine the first estimate of the amount of power consumed by the processor by:

determining the amount of power consumed by the processor at the first frequency;

determining that the processor is to use the first frequency for a first time period while performing the task based on the amount of power consumed by the processor at the first frequency;

determining the amount of power consumed by the processor at the second frequency; and determining that the processor is to use the second frequency for a second time period while performing the task based on the amount of power consumed by the processor at the second frequency.

12. The system of claim 10, wherein:

the target operating-characteristic comprises both (i) a target speed at which the processor is to perform the task and (ii) the target amount of power consumption by the processor while performing the task;

the first estimate indicates that the processor is capable of performing the task at a first speed and with a first amount of power consumption by using the first pair of frequencies; and the second estimate indicates that the processor is capable of performing the task at a second speed and with a second amount of power consumption by using the second pair of frequencies.

13. The system of claim 12, wherein the memory further comprises instructions that are executable by the processor for causing the processor to select the first pair of frequencies by determining that (i) the first speed is closer to the target speed than the second speed, and (ii) the first amount of power consumption is closer to the target amount of power consumption than the second amount of power consumption.

14. The system of claim 12, wherein the target speed is a minimum speed at which the processor is to perform the task, and wherein the memory further comprises instructions that are executable by the processor for causing the processor to select the first pair of frequencies by determining that (i) the first speed is greater than or equal to the minimum speed at which the processor is to perform the task, and (ii) the first amount of power consumption is closer to the target amount of power consumption than the second amount of power consumption.

15. A non-transitory computer-readable medium comprising program code that is executable by a processor for causing the processor to:

determine (i) a first estimate of an operating characteristic of the processor in using a first pair of frequencies to perform a task, and (ii) a second estimate of the operating characteristic of the processor in using a second pair of frequencies to perform the task;

select the first pair of frequencies based on determining that the first estimate is closer to a target operating-characteristic of the processor while performing the task than the second estimate; and based on selecting the first pair of frequencies:

set clock rate of the processor to a first frequency in the first pair of frequencies while performing the task; and change the clock rate of the processor from the first frequency to a second frequency in the first pair of frequencies while performing the task.

16. The non-transitory computer-readable medium of claim 15, wherein the target operating-characteristic comprises a target amount of power consumption by the processor while performing the task, and further comprising program code that is executable by the processor for causing the processor to determine the first estimate and the second estimate by:

determining a first estimate of an amount of power consumed by the processor in using the first pair of frequencies to perform the task; and determining a second estimate of the amount of power consumed by the processor in using the second pair of frequencies to perform the task.

17. The non-transitory computer-readable medium of claim 16, wherein:

the target operating-characteristic comprises both (i) a target speed at which the processor is to perform the task and (ii) the target amount of power consumption by the processor while performing the task;

the first estimate indicates that the processor is capable of performing the task at a first speed and with a first amount of power consumption by using the first pair of frequencies; and the second estimate indicates that the processor is capable of performing the task at a second speed and with a second amount of power consumption by using the second pair of frequencies.

18. The non-transitory computer-readable medium of claim 17, further comprising program code that is executable by the processor for causing the processor to select the first pair of frequencies by determining that (i) the first speed is closer to the target speed than the second speed, and (ii) the first amount of power consumption is closer to the target amount of power consumption than the second amount of power consumption.

19. The non-transitory computer-readable medium of claim 17, wherein the target speed is a minimum speed at which the processor is to perform the task, and further comprising program code that is executable by the processor for causing the processor to select the first pair of frequencies by determining that (i) the first speed is greater than or equal to the minimum speed at which the processor is to perform the task, and (ii) the first amount of power consumption is closer to the target amount of power consumption than the second amount of power consumption.

20. The non-transitory computer-readable medium of claim 15, further comprising program code that is executable by the processor for causing the processor to:

determine that the processor is to use the first frequency for a first time period while performing the task; and determine that the processor is to use the second frequency for a second time period while performing the task, the second time period non-overlapping with the first time period.

* * * * *